UNITED STATES PATENT OFFICE.

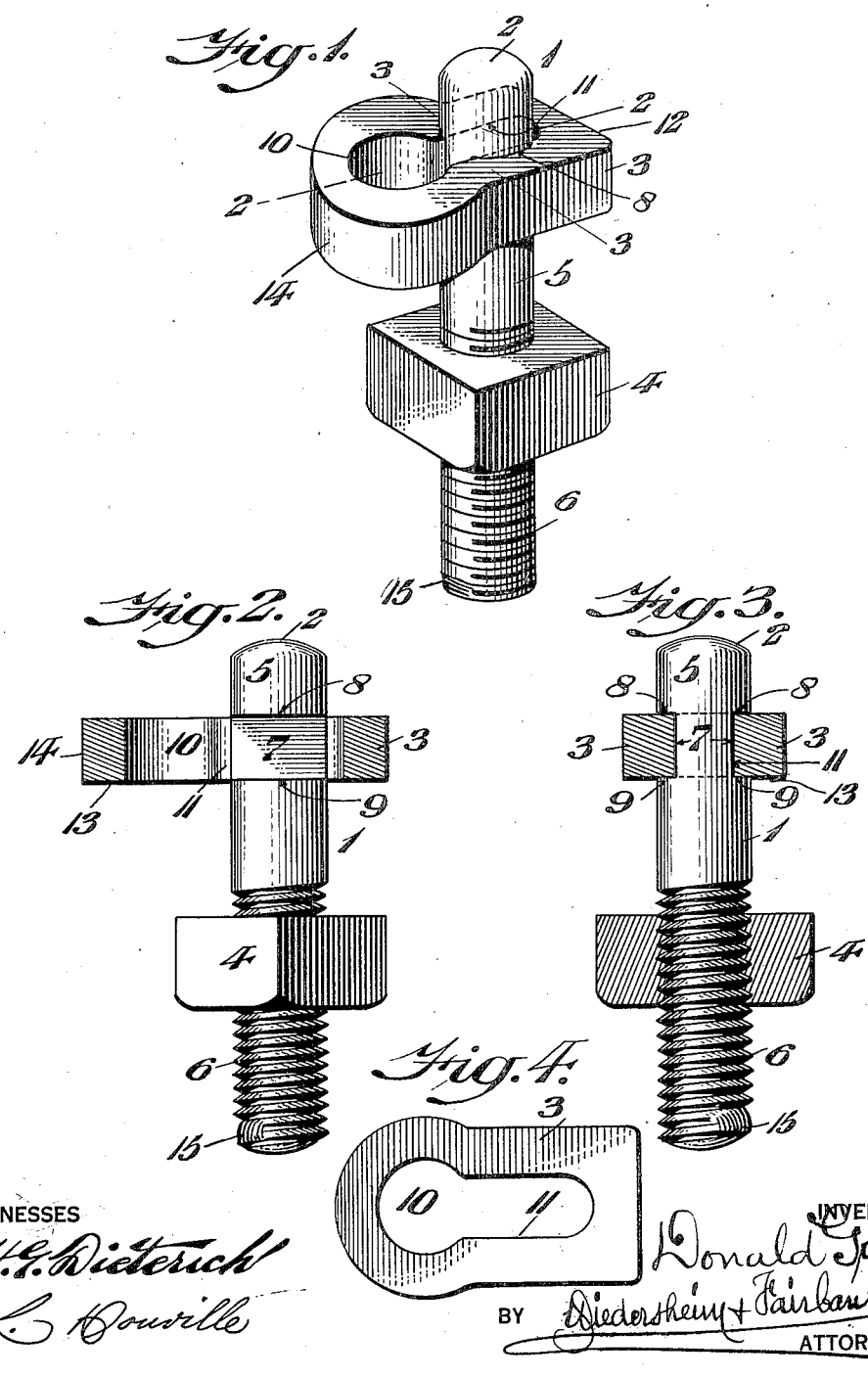

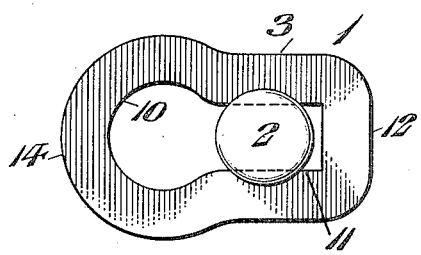
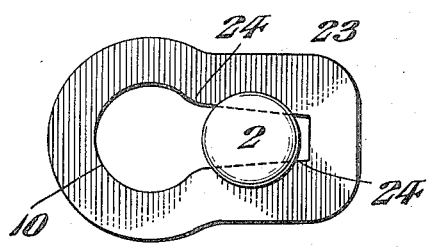
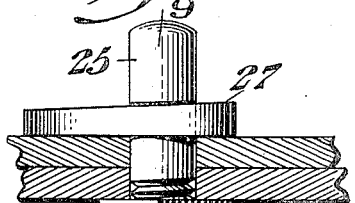
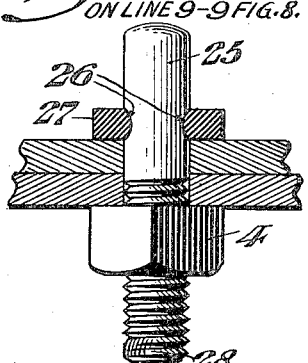
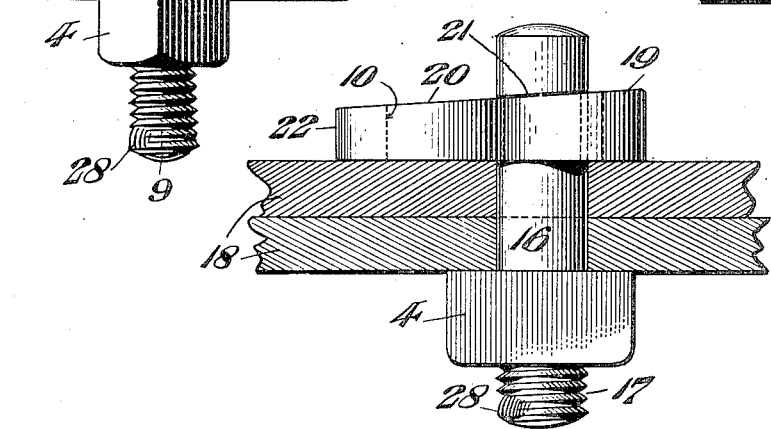
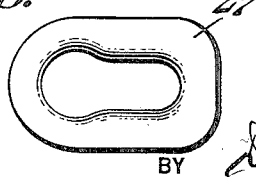

DONALD GAY, OF NEWPORT NEWS, VIRGINIA.

FITTING-UP BOLT.

1,205,883.      Specification of Letters Patent.      Patented Nov. 21, 1916.

Application filed April 25, 1916. Serial No. 93,409.

*To all whom it may concern:*

Be it known that I, DONALD GAY, a citizen of the United States, residing in the city of Newport News, county of Warwick, State of Virginia, have invented a new and useful Fitting-Up Bolt, of which the following is a specification.

In structural steel work, as in shipyards, boiler plants, bridge work and the erection of modern buildings, wherein steel plates, sheets, beams, girders or the like are to be riveted together and have been already punched for the reception of rivets, it is customary to temporarily hold the same in position by means of nuts and bolts, the latter having a head forged thereon of the usual construction, which bolts are temporarily placed in position and removed by the riveters. This employment of a nut and bolt of the customary character necessitates initially the production of a forged head on the bolt, and where these devices are used in large quantities, it involves considerable expense in the initial production. Furthermore, the manipulation of the nut to effect the temporary clamping of the sheets, plates, beams, girders or the like, which are to be riveted, also requires the expenditure of considerable time on the part of the workman both to tighten and loosen the nut, and it is furthermore necessary where an ordinary nut and bolt are employed, to entirely remove the nut from the screw-threads of the bolt before the latter can be withdrawn. There are other disadvantages incident to the employment of an ordinary bolt or nut for the purpose above stated, since it frequently happens that the apertures in the two overlying sheets, plates, beams, girders or the like to be riveted, are not always in exact alinement or perfectly concentric, so that in driving in the temporary fitting-up bolt of the usual construction, the thread thereof is frequently injured, making it difficult to apply the nut, which not only makes the unscrewing and screwing on of the nut by the riveters take an undue amount of time, but is moreover frequently rendered somewhat difficult by the injury to the bolt thread. In addition, this item of keeping the threads of these bolts in perfect condition and the repair of the same amounts to considerable expense in a large shop.

By my novel construction, there is no danger of any injury to the bolt threads, since the portion of my novel fitting-up bolt, which is inserted through the members to be riveted is smooth or practically unthreaded, so that the expense of time and labor heretofore involved in keeping up the threads on fitting-up bolts is by my construction almost entirely dispensed with or reduced to a minimum.

To the above ends, my present invention, which is designed to obviate the foregoing objections inherent to the employment of an ordinary bolt or nut for the purpose described, comprises a novel construction of fitting-up bolt which has no head forged thereon and is provided with screw-threads at one end for the reception of a nut, the opposite end of the body or bolt proper being provided with recesses adapted to coact with a locking member or slotted plate having an aperture therethrough of different diameters, so that when it is desired to use my novel fitting-up bolt, it is only necessary to insert the unthreaded portion of the bolt member through the alined or concentric holes in the plates or beams to be riveted, and then by a blow of a hammer or other implement, drive the locking member laterally into the desired position.

When it is desired to remove my novel construction of fitting-up bolt or lock bolt, it is only necessary to hit the locking member with a hammer or other implement, whereupon said locking member is instantly disengaged from the bolt and the latter may drop or be readily disengaged from its position.

By the employment of my novel construction of fitting-up bolt or lock bolt, the initial expense of the forged head on the bolt member is entirely dispensed with, much time is saved in the placing of the device temporarily in position and removing it from position after the riveting has been effected, and the expensive item of continually renewing or repairing the screw threads is practically dispensed with.

To the above ends, my invention consists of a novel construction of a fitting-up bolt having one end threaded for the reception of a nut, and the other end recessed on opposite sides to form shoulders with which my novel construction of slotted locking member coöperates.

For the purpose of illustrating my invention, I have shown in the accompanying drawings, certain embodiments thereof which are at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described except as defined by the scope of the appended claims.

Figure 1 represents a perspective view of a lock bolt or fitting-up bolt embodying my invention. Fig. 2 represents a side elevation of a fitting-up bolt showing the locking member in section, the section being taken on line 2—2 Fig. 1. Fig. 3 represents a sectional view on line 3—3 Fig. 1. Fig. 4 represents a plan view of the locking member removed. Fig. 5 represents a plan view of the locking member and coacting bolt member seen in Fig. 1. Fig. 6 represents a side elevation of another embodiment of my invention, showing the same temporarily in place, the plates or sheets to be riveted being shown in section. Fig. 7 represents another embodiment of my invention, wherein the walls of the slot of the locking member instead of being parallel, as shown in Figs. 1 to 5, are shown as converged. Fig. 8 represents a side elevation, partly in section, of another embodiment of my invention. Fig. 9 represents a side elevation, partly in section, on the line 9—9 Fig. 8. Fig. 10 represents a plan view of the locking member employed in Figs. 8 and 9.

Similar numerals of reference indicate corresponding parts in the figures.

Referring to the drawings: 1 designates my novel construction of a fitting-up bolt, the latter comprising the headless body or shank member 2, the locking member 3 and the nut 4. The bolt 2 is shown in the present instance as having the round or other shaped body or shank portion 5, the lower end of the bolt being provided with the threaded portion 6, engaged by the nut 4. The end of the bolt member opposite to its threaded portion is cut away on opposite sides forming recesses, as indicated at 7, having the upper shoulders 8 and the lower shoulders 9, said diametrically located grooves or recesses forming a neck which is adapted for coöperation with the locking member 3, which comprises the plate having an aperture 10 therethrough, which is of greater diameter than the diameter of the bolt 2.

The aperture 10 communicates with the slot 11, the walls of which in the construction seen in Figs. 1 to 4 are substantially parallel and adapted to engage the neck formed by the recesses 7, as will be understood from Fig. 3, so that after the bolt 2 has been temporarily passed through the sheets, plates, beams, girders or the like, which are to be secured together, the locking member 3 can be placed upon the bolt member 2, so that the latter passes through the aperture 10. It will of course be understood that the locking member 3, being made of metal is rigid and unyielding throughout, and that the walls or faces of the slot 11 are straight in the direction of their length, so as to facilitate the ready disengagement of said locking member, when such action is desired. The operator then hits the locking member 3 a blow with a hammer or other implement, against the face 12, whereupon the parts assume the position seen in Figs. 1, 2 and 3, it being observed that the locking member 3 in this position will firmly hold the plates, beams or girders temporarily in the desired position by reason of the engagement of the walls of the slot 11 with the recesses, as indicated at 7, the sheets or plates riveted being firmly held temporarily in the desired position between the bottom surface 13 of the locking member 3 and the nut 4. If desired or necessary, after the bolt and locking member are assembled, the nut 4 can be tightened against the contiguous plate by any suitable implement so as to draw the juxtaposed plates closely together and thus retain them during the operation of reaming or riveting.

It will be further apparent that very little manipulation of the nut 4 will be necessary in order to effect the desired locking or adjustment of the fitting-up bolt with respect to the plates, beams, girders or the like to be riveted. When it is desired to remove or unlock the device, it is only necessary to hit the locking member 3 with a hammer or other implement at about the point 14, whereupon the circular opening 10 will be knocked into alinement with the end 2 of the bolt and the bolt 5 can then drop either by gravity or by a slight blow from a hammer, without necessitating any manipulation of the nut 4, it being noticed that the bolt has no head to impede its progress through the opening 10 of the locking member 3. If desired, I may slightly upset the screw-threads 6, as indicated at the point 15, so that the nut 4 will always be prevented from disengagement from the threads 6, as will be evident.

It will be seen from the foregoing that by the employment of my device, a great saving is effected in the initial production of the fitting-up bolt, since it is only necessary to cut the bolts off to the desired length and thread and recess the same, whereby the expense of a forged head is obviated. Furthermore, there is a great saving of time in the application of my device, since after the locking member 3 is placed in position, it is only necessary to tap it with a hammer or other implement, if necessary, and thereafter if desired to tighten the nut 4 to effect the desired temporary locking of the plates or beams or girders to be riveted, and when it is desired to unlock the same or remove the fitting-up bolt, only a slight blow or tap of a hammer or other implement on the locking member is required, thereby effecting great saving of time and labor.

In the construction seen in Fig. 6, I have shown another embodiment of my invention, wherein the bolt member 16 is shown screw-threaded as at 17, and provided with a nut 4, as already described. 18 designates the plates or the like, to be temporarily held together prior to and during riveting, and 19 designates the locking member, which is of the same construction as seen in Fig. 1, except that the top surface 20 thereof is shown as inclined, beveled or cam-shaped, the end having the aperture 10 being thinner than the opposite end containing the slotted portion 11. The locking member may be otherwise constructed, as already described, being provided with the round opening 10 and the narrow or contracted walls 11, as seen in Figs. 1 to 5. I preferably, however, make the shoulder 21 of the top of the bolt 16 slightly inclined, as seen in Fig. 6, so as to correspond with the inclined top surface 20 of the locking member. In Fig. 6, the parts are shown in assembled position, and it will be apparent that a slight tap of a hammer or other implement upon the end 22 will be sufficient to dislodge the locking member from position and enable the fitting-up bolt to instantly drop or be knocked out of position.

If desired, I may employ the locking member 23 seen in Fig. 7, the same having the circular opening 10 therethrough and being provided with the converging walls 24, it being understood that the walls of the recesses of the bolt 2 seen in Fig. 7, are preferably converged to correspond with the convergence of said walls 24.

In Figs. 8, 9 and 10, I have shown another construction which may be employed, which construction differs from the construction seen in Figs. 1 and 3, in that opposite portions of the bolt 25 are provided with curved recesses, as indicated at 26, the construction of the walls of the slot of the locking member 27 conforming thereto but being otherwise the same as that seen in Fig. 5. The manner of assembling, locking and unlocking the devices seen in Figs. 8, 9 and 10 will be clearly apparent to those skilled in the art without further description. In the construction seen in Figs. 8, 9 and 10, I may also if desired upset or slightly enlarge the threaded extremity 28 of the bolt so as to prevent the nut 4 from accidentally being removed therefrom, although if desired, I may omit this expedient from all the constructions.

It will be apparent from the foregoing that all the embodiments of my invention are capable of advantageous use in connection with all structural steel work, such as the erection of modern buildings, construction of bridges, building of ships, boilers or the like, wherein steel beams, girders, plates or other parts already punched for the reception of rivets must be assembled and temporarily held in position prior to riveting.

I desire to call special attention to the fact that in the practical use of my device, very little manipulation of the nut 4 is required, and practical experience has demonstrated that there is little opportunity or liability for the threads 6 to be damaged, since only the unthreaded portion of the fitting-up bolt is employed to secure the plates, beams or girders temporarily in position. There is, consequently, a great saving effected by the practical elimination of the expense of keeping the threads of the bolts and nuts in perfect threaded condition.

It will be understood by those skilled in the art, that, as heretofore briefly explained, in modern steel construction, wherein it is necessary to temporarily bolt together steel plates, shapes, beams, girders, and the like, preparatory to riveting, as in the construction of steel ships, steel cars, boilers, and the like, it is generally, if not universally customary in practice after first punching the rivet holes in said shapes and plates to next assemble said shapes so that said holes may be as nearly as possible in alinement. An ordinary threaded bolt, which is generally employed as the fitting-up bolt, is next inserted through about every third alining pair of juxtaposed rivet holes, and as these juxtaposed holes are almost always slightly out of alinement, the act of forcing the threaded end of the bolt through said holes, either manually or by hammering as is done in the great majority of instances, slightly damages more or less the thread on the bolt, so that it is difficult to start the nut in the bolt thread. In large establishments, such as shipyards or boiler shops, there is a special department called "bolters up", which is composed of workmen, who are not skilled operatives and who if there is any difficulty in manually forcing a bolt in place, forcibly hammer on it, which proceeding invariably damages the bolt threads. The next step is for the "bolters up" to put on the nuts and tighten them so as to draw the plates together, it being understood that the juxtaposed contiguous surfaces of the plates are almost invariably somewhat bulged or buckled, and for a proper job of riveting to be effected, it is necessary that they be drawn as closely against each other as possible, which is done by the "bolters up" tightening the nuts, which it is obvious will be attended with more or less difficulty, when the bolt threads are damaged during their insertion in place.

Prior to the operation of riveting, it is necessary for the juxtaposed bolt holes to be reamed, the first reaming being done to the holes, which have no fitting-up bolts therein, whereupon the fitting-up bolts are removed and inserted in one of the pairs of reamed holes, which operation obviously requires considerable time under the old practice, because it is necessary to entirely remove the nut from each bolt, and in case the bolt threads are damaged, as above explained, additional time is required and lost by the "bolters up."

The "bolters up" usually work on piece work, and consequently seek to remove the nuts aforesaid in the most expeditious manner possible, frequently hammering on them and in some cases even using a pneumatic chipping hammer, which so distorts the shape of the nut, that it cannot be reclaimed, the nut spinning off the bolt and dropping to the ground and its threads becoming full of dirt and rubbish, so that it is necessary for the nut to go to the repair shop to be retapped before it can be used again. In many instances, the nuts are so damaged during their removal, that no attempt is made to reclaim them at all.

It will be understood that the nut which is on the outside of shell plating work (to which we are now referring) has now dropped to the ground and the operatives next knock the bolts of the usual construction out of the rivet holes and they fall into the hold or bottom of the ship, which may be a distance of many feet, and the bolt threads being unprotected by the nut thereon are consequently liable to further damage. These bolts ordinarily lie for some little time in the bottom or hold of the ship with other rubbish and are later reclaimed at considerable expense, it being always necessary for these used bolts to be rethreaded in the repair shop before they can be used a second time. This single item of the mere reclaiming of the bolts and nuts above referred to in a modern shipyard under present methods amounts approximately to one thousand dollars a week, a very large proportion of which sum is saved by my invention for the following reasons, now referred to in greater detail than heretofore.

In my device, the unthreaded portion of the fitting-up bolt is first inserted through the alining rivet holes, thereby eliminating all liability of damage to the screw threads. My novel bolt having been initially inserted in position, the locking member, as 19 in Fig. 6, can be first slid manually in a direction parallel to the axis of the bolt and then laterally in a direction at right angles to the axis of said bolt, until the parts are substantially in the position seen in Fig. 6, so that when the nut 4 is tightened to bring the bulged or buckled plates closely into contact, a more satisfactory result is obtained, since an extended bearing surface is offered by the area of the locking member 19, which is considerably greater than the area of an ordinary bolt head, it being frequently necessary when ordinary bolts are employed to use washers under the bolt heads to give the required bearing surface. There is, furthermore, a great economy of time effected in the removal of my device, since when it is desired to remove my fitting-up bolt, either for reaming or riveting, no manipulation of the nut is necessary, since a single blow of a hammering implement, against the end 22 of the locking member 19, as seen in Fig. 6, will dislodge the locking member, which can be dropped into a bucket or other receptacle, and my locking member furthermore has no screw threads or the like liable to be damaged, even in case said locking member falls to the bottom or hold of the ship or to the ground. When my bolt and the nut thereon, which latter is located outside of the shell, is knocked out, even if it falls to the ground, the nut thereon, which in practice need never be removed, will protect the screw threads and save them from injury, thereby entirely eliminating the necessity of sending the bolt to the repair shop to be rethreaded, or the nut to be retapped. I thus eliminate entirely the above heavy items of repair expense, and in addition, there is a great saving of time in the insertion and removal of my fitting-up bolt, which consequently permits the riveters to drive more rivets, thereby hastening the completion of the job. It will be further apparent that in my device the nut is always in assembled position on the bolt, so that the time heretofore frequently lost in hunting for a nut to fit a bolt or vice versa is saved, and furthermore, the life of the nut as well as of the bolt is greatly prolonged, since there is no necessity in my device for frequently rethreading the nut or the bolt, which operation necessarily weakens the threads of both said bolt and nut.

It will now be apparent that I have devised a novel and useful fitting-up bolt, which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars consistent with the scope of the appended claims without departing from the spirit or scope of the invention or sacrificing any of its advantages.

Having thus described my invention, what I claim as new and desire to secure by Letters Patent, is:—

1. In a fitting-up bolt for temporarily holding structural steel plates, shapes and the like in position preparatory to reaming and riveting, the combination of a headless bolt body having a screw threaded portion and a plain unthreaded portion of substantially the same diameter, said body being adapted to be initially inserted with said plain unthreaded portion forward through perforations of substantially the same size as said bolt in the plates or shapes to be temporarily held, the sides of said plain portion near the outer end thereof being transversely recessed to form a neck, a nut mounted on said threaded portion, and a rigid locking member formed in one piece and adapted to be mounted on said neck and disposed at a right angle thereto, said locking member being adapted to contact with said plates or shapes interposed between it and said nut, and having an aperture therethrough of greater diameter than said bolt body, said aperture terminating in a laterally extending slot having its faces straight in the direction of its length, the width of said slot being substantially the same as the thickness of said neck, said locking member in assembling being adapted to be first moved in a direction parallel to the axis of said bolt and then in a direction at a right angle to the axis of said bolt until said slot and neck interlock, whereby said bolt body and locking member are interlocked without the assistance of extraneous means.

2. In a fitting-up bolt for temporarily holding structural steel plates, shapes and the like in position preparatory to reaming and riveting, the combination of a headless bolt body having a screw threaded portion and a plain unthreaded portion of substantially the same diameter, said body being adapted to be initially inserted with said plain unthreaded portion forward through perforations of substantially the same size as said bolt in the plates or shapes to be temporarily held, the sides of said plain portion near the outer end thereof being transversely recessed to form a neck, a nut mounted on said threaded portion, and a rigid locking member formed in one piece and adapted to be mounted on said neck and disposed at a right angle thereto, and to contact with said plates or shapes interposed between it and said nut, said locking member having an aperture therethrough of greater diameter than said bolt body, said aperture terminating in a laterally extending slot having its faces straight in the direction of its length, the width of said slot being substantially the same as the thickness of said neck, and said locking member having its outer wall inclined from said slot portion toward its opposite end to facilitate its disconnection from said bolt.

DONALD GAY.

Witnesses:
   FRED SHAWEN,
   J. W. REYNOLDS.